United States Patent
Mahalingam

(10) Patent No.: US 9,578,178 B2
(45) Date of Patent: Feb. 21, 2017

(54) MULTICALL TELEPHONE SYSTEM

(71) Applicant: Padmanabhan Mahalingam, Madras (IN)

(72) Inventor: Padmanabhan Mahalingam, Madras (IN)

(*) Notice: Subject to any disclaimer, the term of this patent is extended or adjusted under 35 U.S.C. 154(b) by 0 days.

(21) Appl. No.: 14/589,406

(22) Filed: Jan. 5, 2015

(65) Prior Publication Data

US 2015/0117627 A1    Apr. 30, 2015

Related U.S. Application Data

(62) Division of application No. 13/591,633, filed on Aug. 22, 2012, now abandoned.

(60) Provisional application No. 61/526,056, filed on Aug. 22, 2011.

(51) Int. Cl.
*H04M 3/42* (2006.01)
*H04M 3/56* (2006.01)
*H04M 3/44* (2006.01)
*H04M 3/493* (2006.01)
*H04M 7/12* (2006.01)

(52) U.S. Cl.
CPC ............ *H04M 3/563* (2013.01); *H04M 3/44* (2013.01); *H04M 3/4935* (2013.01); *H04M 7/1295* (2013.01); *H04M 2203/5063* (2013.01)

(58) Field of Classification Search
USPC ............ 379/202.01; 370/260, 261; 455/416
See application file for complete search history.

(56) References Cited

U.S. PATENT DOCUMENTS

| | | | | |
|---|---|---|---|---|
| 5,631,904 | A * | 5/1997 | Fitser ................ | H04M 3/56 370/261 |
| 6,038,304 | A * | 3/2000 | Hart ................ | H04M 3/56 370/260 |
| 2007/0067439 | A1* | 3/2007 | Mason .............. | H04L 51/04 709/224 |
| 2008/0159503 | A1* | 7/2008 | Helbling ........... | H04M 3/565 379/142.17 |
| 2010/0271457 | A1* | 10/2010 | Thapa ............... | H04N 7/141 348/14.08 |

* cited by examiner

*Primary Examiner* — Quynh Nguyen
(74) *Attorney, Agent, or Firm* — Donald R. Boys; Central Coast Patent Agency, Inc.

(57) ABSTRACT

A Multicall telephony system has a first land-line telephone connected to a central switch in a land-line telephone network and a server executing SW on a processor from a non-transitory medium, the server also coupled to the land-line telephone system by a service telephone number. In operation a user dials the service telephone number, and when connected, dials two or more telephone numbers separated by delimiters and followed by a terminator character, and the server, executing the software, dials the two or more telephone numbers separated by delimiters in the call from the first land-line telephone, and connects answered calls in a conference with the call placed by the first land-line telephone.

8 Claims, 2 Drawing Sheets

MULTICALL TELEPHONE SYSTEM

CROSS-REFERENCE TO RELATED APPLICATIONS

The present application is a divisional application of the application Ser. No. 13/591,633, filed Aug. 22, 2012, which claims priority to Provisional Application Ser. No. 61/526,056 filed Aug. 22, 2011, which are incorporated in this application in its entirety at least by reference.

BACKGROUND OF THE INVENTION

1. Field of the Invention

This invention is in the technical area of telephony, and pertains more particularly to enabling multiple calls with a single initiation.

2. Description of Related Art

In current art a telephone essentially allows one person to call another. It is a one-to-one communication instrument. Bust most interactions today require more than two people in the conversation, be it going to lunch with friends or a family dinner or a business conference.

There are indeed conferencing systems well-known in the art, wherein a plurality of persons may be connected, but these do not serve the purpose of a situation where a person might wish to communicate quickly with the same group of people in the same manner of calling one person.

What is clearly needed is a system wherein a person may call a plurality of people in one call by a system of hardware and software.

BRIEF SUMMARY OF THE INVENTION

In one embodiment of the invention a Multicall telephony system is provided, comprising a first land-line telephone connected to a central switch in a land-line telephone network and a server executing SW on a processor from a non-transitory medium, the server also coupled to the land-line telephone system by a service telephone number. A user dials the service telephone number, and when connected, dials two or more telephone numbers separated by delimiters and followed by a terminator character, and the server, executing the software, dials the two or more telephone numbers separated by delimiters in the call from the first land-line telephone, and connects answered calls in a conference with the call placed by the first land-line telephone.

In one embodiment of the system the server is connected to a cellular telephone system and places calls to the two or more telephone numbers on one or the other of the land-line telephone system or the cellular telephone system. Also in one embodiment the server is connected to the Internet network, and the user is enabled to enter addresses and designators of communication devices in addition to telephone numbers in the call to the service telephone number, and the server initiates transactions with the telephones and other communication devices represented by the addresses and designators, and places answered transactions into the conference with the first land-line telephone.

In one embodiment the server is enabled to recognize and respond to Digital Tone Multiple Frequency (DTMF) tones in the call placed by the first land-line telephone, and the user is enabled to enter the string of two or more telephone numbers or addresses and designators as DTMF tone strings. Also in one embodiment the user enters the DTMF tones to an earpiece of the first land-line telephone by generating the DTM tones through a speaker of a computerized mobile telephony device.

In another aspect of the invention a Multicall telephony method is provided, comprising dialing a service telephone number of a land-line-connected telephone coupled to a server executing SW on a processor from a non-transitory medium, dialing on the first land-line telephone, once connected, two or more telephone numbers separated by delimiters and followed by a terminator character, dialing, by the server executing the software, the two or more telephone numbers separated by delimiters in the call from the first land-line telephone, and connecting answered calls in a conference with the call placed by the first land-line telephone.

In one embodiment of the method the server is connected to a cellular telephone system and places calls to the two or more telephone numbers on one or the other of the land-line telephone system or the cellular telephone system. Also in one embodiment the server is connected to the Internet network, and the user is enabled to enter addresses and designators of communication devices in addition to telephone numbers in the call to the service telephone number, and the server initiates transactions with the telephones and other communication devices represented by the addresses and designators, and places answered transactions into the conference with the first land-line telephone.

In one embodiment of the method the server is enabled to recognize and respond to DTMF tones in the call placed by the first land-line telephone, and the user is enabled to enter the string of two or more telephone numbers or addresses and designators as DTMF tone strings. Also in one embodiment of the method the user enters the DTMF tones to an earpiece of the first land-line telephone by generating the DTM tones through a speaker of a computerized mobile telephony device.

DETAILED DESCRIPTION OF THE INVENTION

Figure 1:
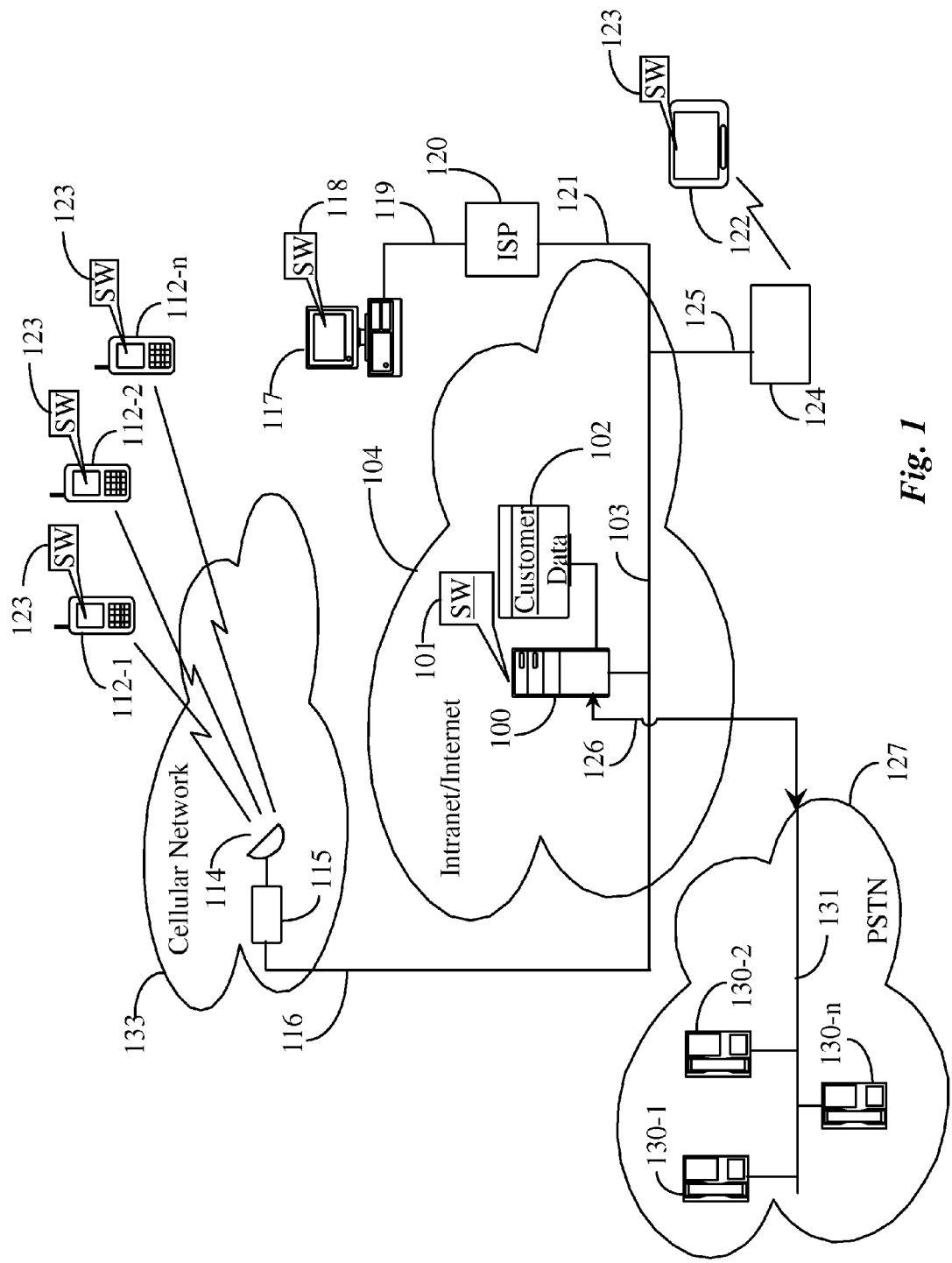
FIG. 1 is an architectural diagram illustrating organization and practice of the invention in one embodiment.

FIG. 1 is an architectural diagram illustrating organization and practice of the invention in one embodiment. Functions of the invention are partly centered in an Internet-connected server 100, executing software (SW) 101 from a non-transitory medium, also communicating with a data repository 102 which may store user profiles, configurations and the like. In some embodiments users may be clients of a service provided by server 100, which manages telephone calls both in the Internet and through land-line phones connected via gateways not (not shown). In other embodiments the users are not clients, except as they may maintain an account at a wireless telephony service provider or even a land-line service provider.

Multicalls in one embodiment of the invention are placed by users using smartphones 112 operating through a cellular network 133 via base stations 114 and a gateway 115 via path 116 to Internet 104, hence to server 100 running software (SW) 101. Calls may be made through server 100 to other cellular telephones, to land line telephones 130 in PSTN 127 via lines 131, to telephony-enabled computer devices 117 running SW 118 connected to the Internet through an Internet Service Provider (ISP) 120 via lines 119 and 121 to Internet backbone 103, or to such as pad devices 122 enabled for telephony, operating through WiFi networks and gateways 124 via path 125. In some embodiments all of these sorts of devices, enabled for telephony, may also place Multicalls in embodiments of the invention.

Figure 2:
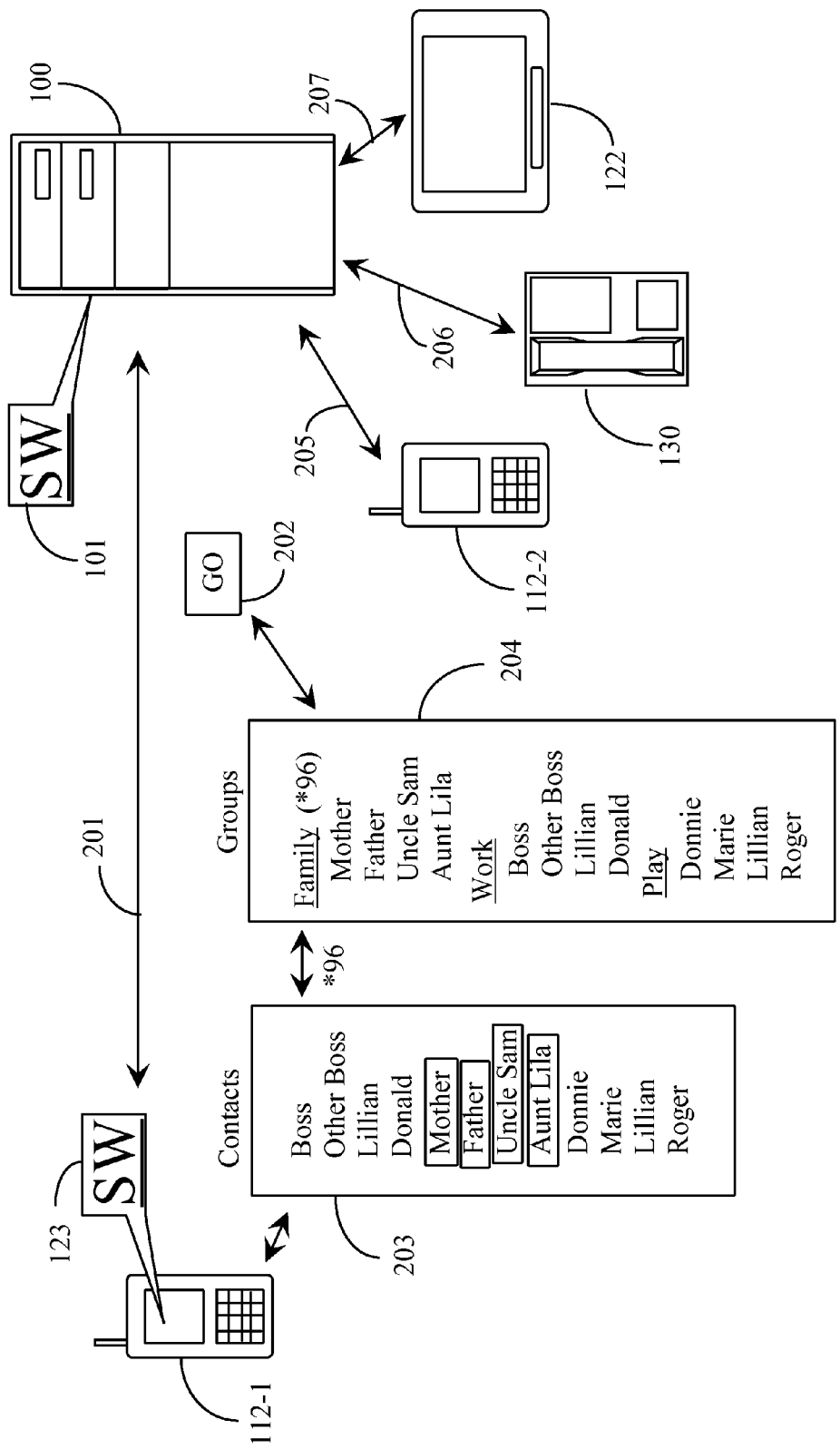
FIG. 2 is a simple diagram illustrating operations in placing a Multicall in an embodiment of the invention.

FIG. 2 illustrates placement of a Multicall by a user with a smartphone 112-1 with a single input in one embodiment of the invention. The smartphone 112-1 in this example executes software (SW) 123, which provides specific functionality to the person operating the telephone. Using smartphone 112-1 executing SW 123 the user may, for example, access his or her address book (contact list) 203, select several contacts and create a group consisting of his close family, for example. In this example the user has selected Mother, Father, Uncle Sam and Aunt Lila in the address book. The user than enters a code, in this case *96, and SW 123 associates the four contacts as a Family group associated with the code *96. Anytime he wishes to speak to his family as a group he can enter the code *96 and press the Go button 202. His phone then places call 201 to server 100. Smartphone 112-1 sends data along with the call by any known data transmission technology available, such as through a data channel or in-band, and the data sent with the call includes in a preferred embodiment the names of the family members that have been selected as a part of the group, and the telephone numbers or IP addresses of each person in the group (associated with the name). Server 100 uses the data sent with the originating call to dial out each of the group members, such as to smartphone 112-2 by call 205, landline telephone 130 by call 206, and to iPad device 122 by call 207, and connects the dialed out calls as answered to the original call 201, creating thereby a conference between the original user and the family members in the group.

In another embodiment it is not necessary that the user create a group and store it, but the user may select any combination of names with telephone numbers or IP addresses in his or her telephone, and then initiate the call by Go 202, which as previously described, will place call 201 to server 100 and send the necessary data along, which the server will use (executing SW 101) to dial out the selected calls and connect answered calls to the original call, creating a conference.

In some cases the operating SW 123 on an initiating device may be firmware or SW provided by the device manufacturer. In other cases such SW may be added to the communication device.

Also in some embodiments there may be a live operator associated with the server with access to Multicalls. This provides agent-assisted Multicalls, such that the user may be provided services of a live agent to assist in the call. In this embodiment call 201 to the server is picked up by the live agent, who will see the names and the telephone numbers, or other destination addresses, on her monitor. For example, one or more called parties in a Multicall may not answer. The operator can inform the initiating user of such problems and assist in their resolution. There may be other difficulties with which a live operator may deal.

Calls to the bridge from various communication devices in different embodiments of the invention can be through the data channel, internet, short message service (SMS), or voice call with characters passed in a string with appropriate separating syntax. When the caller disconnects, all the calls are disconnected. The user may also elect to let the others continue in the call without him by appropriate settings or real time commands through the channels.

As a further example, 3 You can dial Multicall works in a land line too. In this example the network has allotted #123 as a multi call code. The user, using a land line telephone can dial the code and telephone numbers in a string, separated by a delimiter, say *, as #123 831 726 1452*917 464 5649*309 693 0900*212 564 4500. The server will dial the four numbers in a multi call, and connect the calls in a conference.

In yet another embodiment the user might use his smartphone, executing SW 123, to enunciate DTMF tones, such that the user may use the smartphone to control a call over the land line by holding the speaker of the smartphone near the microphone of the landline telephone. The user may save a Multicall code and string as a speed dial in a landline telephone, and the telephone can dial the string through in-band signaling and initiate the Multicall.

Multicall according to embodiments of the present invention is applicable to peer-to-peer systems like Skype™ and Google Talk™ as well.

It will be apparent to a skilled person that the several embodiments described above do not limit the invention, as many of the features and functions described might be performed in any one of several different ways. In different embodiments different features may be present, and others not. Variations of this sort are within the spirit and scope of the invention. The invention is limited only by the claims that follow.

The invention claimed is:

1. A Multicall telephony system, comprising:
a first land-line telephone connected to a central switch in a land-line telephone network; and
an Internet-connected server executing software (SW) on a processor from a non-transitory medium, the server also coupled to the land-line telephone system by a service telephone number;
wherein a user dials the service telephone number, and when connected, dials two or more actual destination telephone numbers, addresses and designators of communication devices in addition to telephone numbers separated by delimiters and followed by a terminator character, said telephone numbers, addresses and designators not previously known to the server, and the server, executing the software, dials the two or more telephone numbers, addresses and designators as entered by the user, separated by delimiters in the call from the first land-line telephone, and connects answered calls from the telephone numbers and connects live communication lines from the communication devices associated with the addresses and designators in a conference with the call placed by the first land-line telephone.

2. The Multi-call telephony system of claim 1 wherein the server is also connected to a cellular telephone system and places calls to the two or more telephone numbers on one or the other of the land-line telephone system the cellular telephone system, data channel, Internet, short message service (SMS), or voice call.

3. The Multi-call telephony system of claim 1 wherein the server is enabled to recognize and respond to DTMF tones in the call placed by the first land-line telephone, and the user is enabled to enter the string of two or more telephone numbers or addresses and designators as DTMF tone strings.

4. The Multi-call telephony system of claim 3 wherein the user enters the DTMF tones to a microphone of the first land-line telephone by generating the DTMF tones through a speaker of a computerized mobile telephony device.

5. A Multicall telephony method, comprising:
dialing a service telephone number of a land-line-connected telephone coupled to an Internet-connected server executing software (SW) on a processor from a non-transitory medium;
dialing on the first land-line telephone, once connected, two or more actual destination telephone numbers, addresses and designators of communication devices in addition to telephone numbers, separated by delimiters and followed by a terminator character, said telephone numbers, addresses and designators not previously known to the server;
dialing and connecting, by the server executing the software, the two or more telephone numbers, addresses and designators, as entered by the user, separated by delimiters in the call from the first land-line telephone; and
connecting answered calls from the telephone numbers and connects live communication lines from the communication devices associated with the addresses and designators in a conference with the call placed by the first land-line telephone.

6. The Multi-call telephony method of claim 5 wherein the server is also connected to a cellular telephone system and places calls to the two or more telephone numbers on one or the other of the land-line telephone system, the cellular telephone system, data channel, Internet, short message service (SMS), or voice call.

7. The Multi-call telephony method of claim 5 wherein the server is enabled to recognize and respond to DTMF tones in the call placed by the first land-line telephone, and the user is enabled to enter the string of two or more telephone numbers, addresses and designators as DTMF tone strings.

8. The Multi-call telephony method of claim 7 wherein the user enters the DTMF tones to a microphone of the first land-line telephone by generating the DTMF tones through a speaker of a computerized mobile telephony device.

* * * * *